United States Patent [19]

Matsushima

[11] Patent Number: 5,117,242
[45] Date of Patent: May 26, 1992

[54] METHOD OF WINDING PAPER ONTO A TAKE-UP ROLLER OF AN AUTOMATIC DRAFTING MACHINE

[75] Inventor: Toshiaki Matsushima, Tokyo, Japan
[73] Assignee: Mutoh Industries Ltd., Tokyo, Japan
[21] Appl. No.: 606,209
[22] Filed: Oct. 30, 1990

[30] Foreign Application Priority Data

Jan. 29, 1990 [JP] Japan .................................. 2-18772

[51] Int. Cl.$^5$ .......................................... B65H 18/00
[52] U.S. Cl. ................................. 346/1.1; 346/136;
242/67.1 R; 242/67.2; 242/67.3 R
[58] Field of Search ............... 346/1.1, 136, 134, 138,
346/33; 242/67.1 R, 67.2, 67.3 R, 67.1 D;
226/1, 200

[56] References Cited

U.S. PATENT DOCUMENTS 4,172,565 10/1979 Zaffarano .................... 242/67.1 R
4,823,147 4/1989 Charropin ......................... 346/136

Primary Examiner—Benjamin R. Fuller
Assistant Examiner—Victor DeVito
Attorney, Agent, or Firm—Wenderoth, Lind & Ponack

[57] ABSTRACT

The method of winding paper onto a take-up roller of an automatic drafting machine, according to the present invention, involves the avoidance of winding the paper after each and every drafting operation. Rather, the method contemplates that, after each drafting operation, it will be determined whether the amount of paper, which has been driven forwardly after being utilized in a drafting operation and which has not yet been wound onto the take-up roller, is greater than a predetermined limiting value. If it is not, then no winding operation takes place. If, however, it is greater than the limiting value, a length of the paper equal to the length forwarded since the last winding operation is wound upon the take-up roller. After each such winding operation, the sequence of the method is repeated.

8 Claims, 4 Drawing Sheets

METHOD OF WINDING PAPER ONTO A TAKE-UP ROLLER OF AN AUTOMATIC DRAFTING MACHINE

BACKGROUND OF THE INVENTION

The present invention relates to a paper winding control method for an automatic drafting machine.

According to a conventional automatic drafting machine as shown in FIG. 5, it has a paper take-up means 4P mounted forwardly of a platen 2P and a paper roller supporting means 6P is mounted rearwardly of the platen 2P. A paper roller is supported by the paper roll supporting means 6P, and the paper 8P is laid across the platen 2P. By reversible rotations of a drive roller 10P, the paper 8P on the platen 2P is moved across the platen 2P in a front-to-back direction of a machine frame of the drafting machine. A writing instrument 12P is driven in a direction perpendicular to the platen 2P so as to carry out a predetermined drafting operation in a predetermined drawing or drafting space on the paper 8P. During the drafting operation, the paper 8p is allowed to become slack at M1 and M2 between the platen 2 and the paper take-up means 4P and the paper supporting means 6P, respectively, so as to avoid tension in the paper 8P. After the drafting operation is completed, the drive roller 10P drives forwardly the part of the paper on which the drafting has been performed, and the take-up means 4P winds up a length of the paper corresponding to the length upon which the drafting was performed.

According to the prior art, the paper is wound onto the paper take-up means after each drafting operation even if the length of paper moved forwardly by the drive roller 10P is small. This lowers the efficiency of the automatic drafting machine. In addition, operation of the paper take-up means after each drafting operation creates noise which can be disturbing to an operator of the drafting machine.

SUMMARY OF THE INVENTION

It is an object of the present invention to provide a paper winding control method for an automatic drafting machine which eliminates the shortcomings of the prior art.

This object is attained, according to the present invention, by a method of separating an automatic drafting machine having a paper supply means for supplying paper, a platen across which the paper is supplied and upon which drafting operations are to be performed, and a paper take-up roller after the paper has been utilized in a drafting operation said method comprising the steps of: moving the paper forwardly after each drafting operation by a distance equal to a length of the paper utilized in each respective drafting operation; determining, after each drafting operation, whether a total of the lengths of paper which have been moved forwardly since the last winding operation is greater than a predetermined limiting value; and performing a winding operation to wind onto the take-up roller a length of the paper equal to said total of the lengths of paper which have been moved forwardly since the last winding operation, when it has been determined that said total of the lengths of paper which have been moved forwardly since the last winding operation is greater than said predetermined limiting value. After the paper is moved forwardly but before a winding operation has taken place, the paper is permitted to hang downwardly between the platen and the take-up roller so as to create slack in the paper and reduce tension thereof. The step of moving the paper forwardly is performed by rotation of a drive roller with the paper interposed between the drive roller and another roller. After each time the paper is moved forwardly, a length value corresponding to said distance moved is added into a computer memory; in said step of determining, the total of said length values stored in said memory is compared to said predetermined limiting value; and after each winding operation is performed, said memory is cleared.

DETAILED DESCRIPTION OF THE INVENTION

The construction of the present invention will now be explained with reference to the accompanying drawings.

Figure 2:
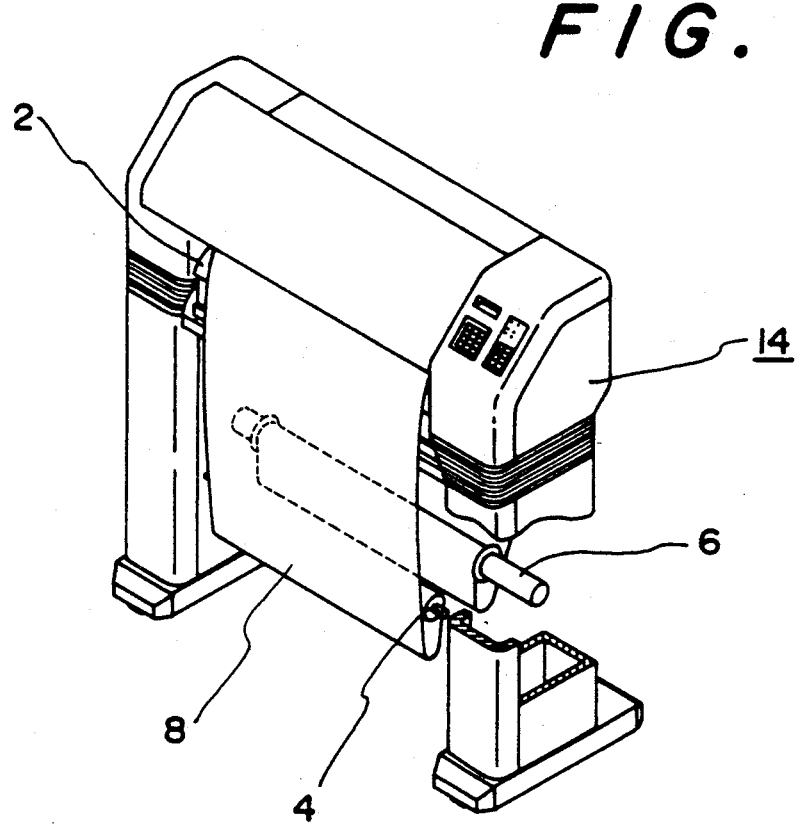
FIG. 2 is a perspective view of an automatic drafting machine used to carry out the paper winding control method of the present invention.
Figure 3:
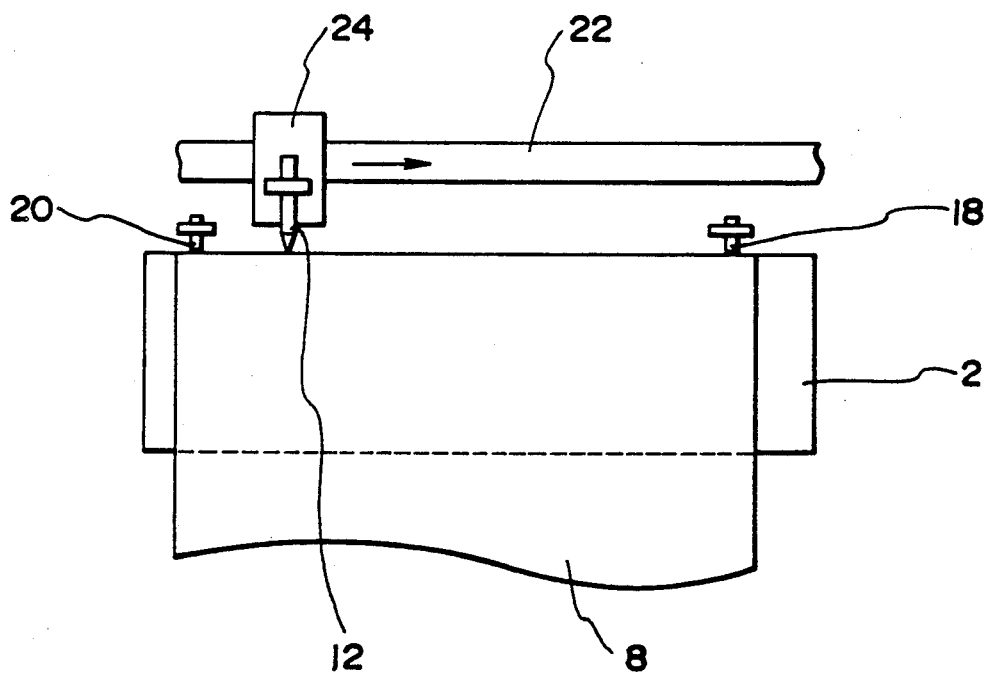
FIG. 3 is a front view of the automatic drafting machine shown in FIG. 2.

As shown in FIG. 2 a platen 2 is installed on the machine frame 14 of an automatic drafting machine. The platen 2 has parallel grooves 2a formed transversely thereacross (see FIG. 4(A)). A drafting roller 16 and a drive roller 10, respectively, are rotatably arranged in the parallel grooves 2a. These rollers 16 and 10 are secured to a shaft which is rotatably supported on a bracket attached to the machine frame 14 so as to rotate cooperatively at the same circumferential speed in the same direction. These rollers 16 and 10 are driven by a paper drive motor to move the paper forwardly and rearwardly (i.e. in an X direction) (not shown). A pair of pressing rollers 18, 20 are arranged to resiliently oppose the drive roller 10 by way of a spring (not shown). A rail 22 is secured between both side portions of the machine frame 14, and a drawing head 24 is secured to the rail 22 so as to move along the rail 22 (i.e. in a Y direction). The drawing head 24 includes a pen holding means and an elevation mechanism for removably holding a writing instrument 12. The drawing head 24 is movable along the rail 22 to traverse the platen 2 in a controlled manner, by a driving force from a drawing head drive motor (not shown). A supporting means 6 is mounted on the machine frame 14 for rotatably supporting the roll of paper 8. A paper take-up means 4 is also mounted on the machine frame 14 and comprises a paper take-up roller and a paper take-up motor (not shown). The supporting means 6 is operated by a paper supplying motor (not shown). A roll of paper 8 is detachably supported on the supporting means. The paper is paid out from the paper roll supported on supporting means 6, extends across the platen 2, and is rolled onto the paper take-up means 4. A controller, comprising a computer and corresponding components, is mounted on the machine 14, and the paper drive motor, the drawing head drive motor, the elevation mechanism of the line drawing head 24, the paper take-up motor, and the paper supply motor are operatively connected to the controller through suitable outputting devices. The controller receives data from a host computer and an operation panel installed on the machine frame in order to drive and control the above-noted device. Consequently, a predetermined drafting operation is performed on the paper 8 against the platen 2.

Figure 1:
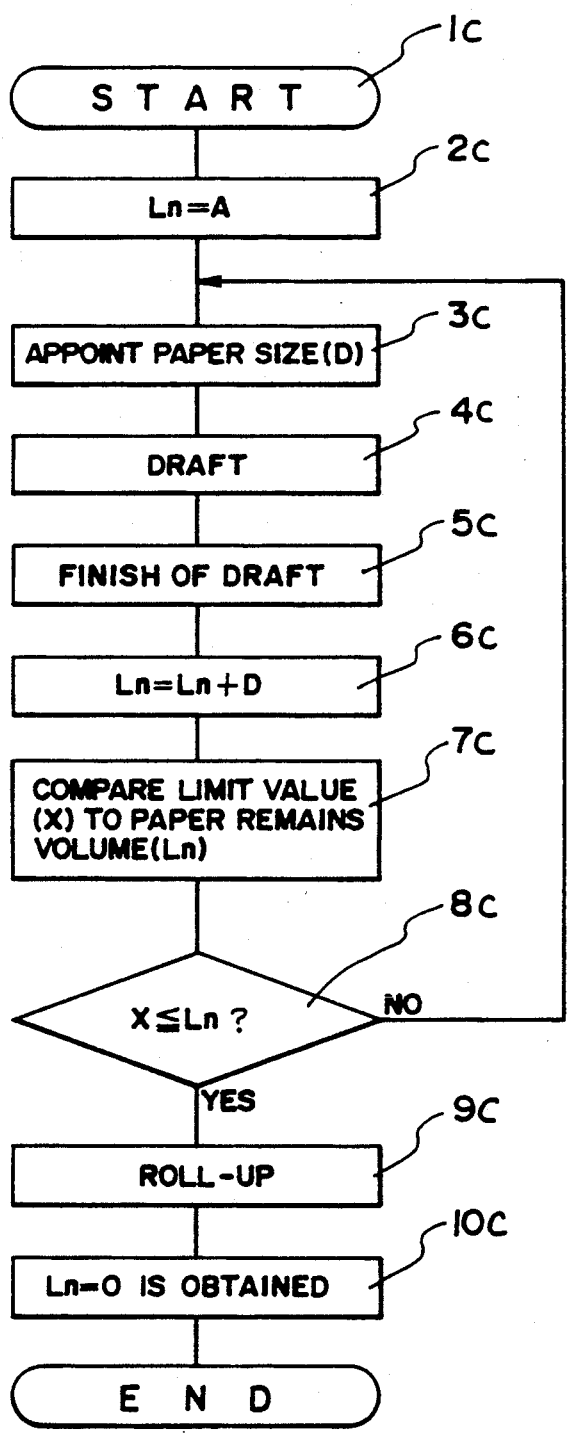
FIG. 1 is a flow chart of the control method of the present invention.

A control operation for winding of the paper, according to the present invention, will now be explained with reference to the flow chart shown in FIG. 1.

The control sequence begins at step 1C. At step 2C, a variable $L_n$, which represents the length of paper upon which a drafting operation has been performed and which is not wound onto the take-up roller 4, is set to an initial value A. For an initial drafting operation, A is zero. A predetermined limiting value X is stored by the controller and corresponds to a length of paper 8 at which it is desirable to have paper wound onto the take-up means 4.

Next, at the step 3c a value D, corresponding to the length of the paper upon which a drafting operation is to be performed, is stored by the controller. In step 4C, the drafting operation is carried out by the controller. When the controller confirms the completion of the drafting operation at step 5C, the paper size value D is added to the previously stored unrolled paper value $L_n$ at a step 6C, and the sum is stored by the controller as $L_n$. Next, the controller compares, at step 7, the limiting value X to the unrolled paper value $L_n$. At step 8C, the controller judges whether $X \leq L_n$. When it is judged that X is not less than or equal to $L_n$ (i.e. Ln is not greater than X), no winding of the paper onto the take-up roller 4 occurs, and the sequence returns to step 3C. On the contrary, when it is judged at the step 8C that X is less than or equal to $L_n$ (i e. $L_n$ is greater than X), at step 9C the controller causes paper 8 to be rolled up or wound onto the take-up roller 4 by an amount corresponding the value $L_n$. Next, the controller sets $L_n=0$ at step 10C to complete one sequence of the operation.

Figure 4A:
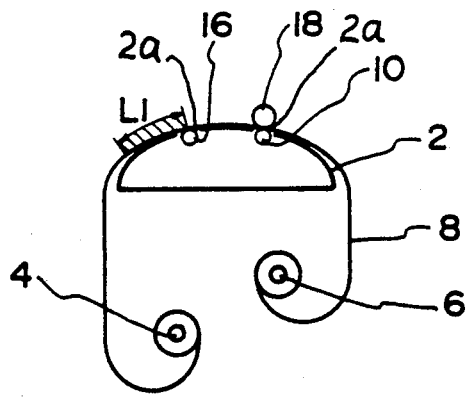
FIGS. 4(A (B), (C) (D), respectively, are schematic views depicting the features of the control method according to the present invention.
Figure 4B:
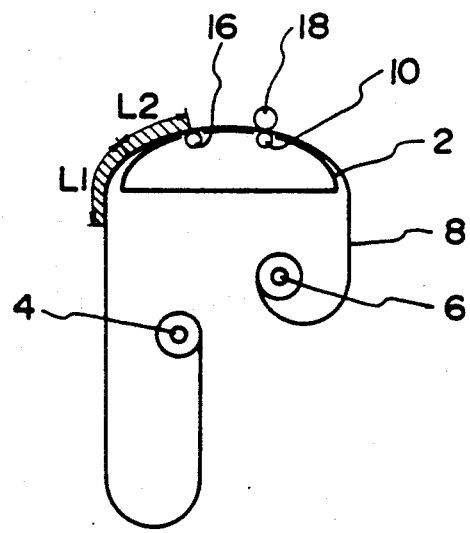
Figure 4C:
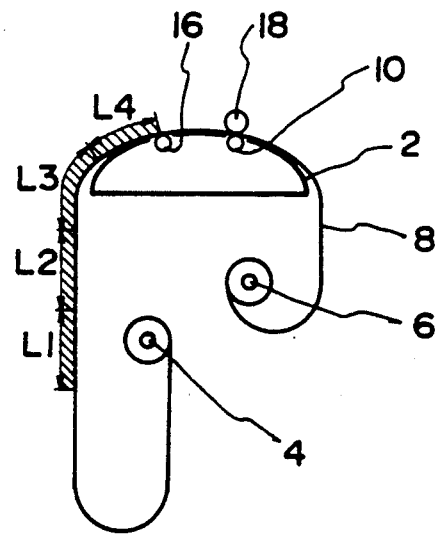
Figure 4D:
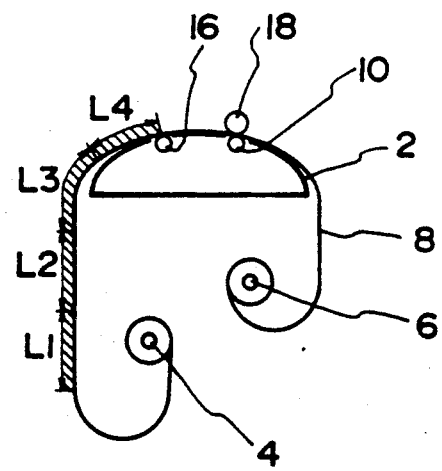
Figure 5:
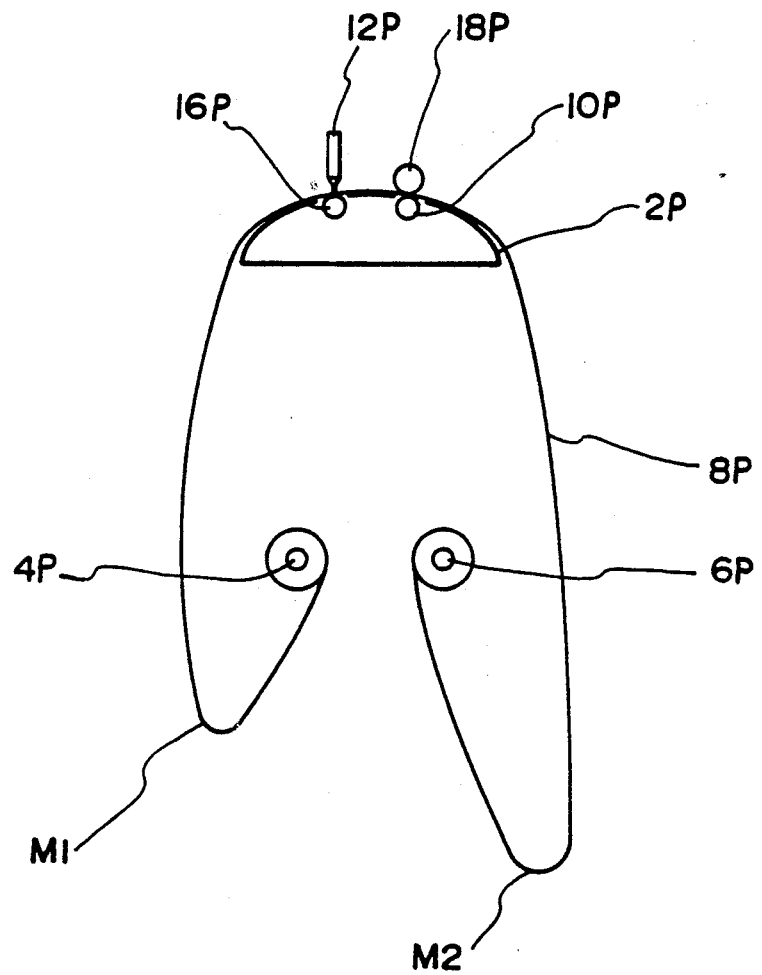
FIG. 5 is a schematic view of a prior art drafting machine.

FIG. 4(A) shows the condition of the paper after a first drafting operation has been completed. Since the paper length D, which is equal to $L_1$, is not greater than the predetermined limiting value X (i.e. see step 8C of FIG. 1), the take-up means 4 is not operated and none of the paper 8 is wound onto the take-up roller. FIG. 4(B) depicts the condition of the paper after a second drafting operation has been performed and the winding operation of the take-up means has again been skipped. At this stage, the paper 8 has been moved forwardly by a distance corresponding to the paper size D (portion of the paper 8 which has been marked upon during the second drafting operation) used in the second drafting operation and the paper 8 has again not been wound onto the take-up roller, such that the length of paper which has been moved forwardly from its drafting position but has not been wound onto the take-up roller is equal to $L_1+L_2$. FIG. 4(C) shows the condition in which a third drafting operation has been performed and the paper 8 has again not been wound onto the take-up roller, such that the length of paper 8 which has not been wound onto the take-up roller is now equal to $L_1+L_2+L_3$. FIG. 4(D) shows the condition in which, after a fourth drafting operation has been completed and the paper 8 has been moved forwardly by a distance $L_4$ corresponding to the paper size D which was marked upon during the fourth drafting operation, the total length of the paper (i.e. L1 +L2 +L3 +L4) reached the limiting value X, so that a length of the paper equal to Ll +L2 L3 +L4 is wound by the take-up means 4. Accordingly, no paper except for an initial reference length of paper, remains which has not been wound onto the take-up roller.

Thus, according to the invention, no winding operation is carried out by the paper take-up means until the length of paper which has been utilized in drafting operations reaches some limiting value, so that there is no loss of time due to winding of the finished paper during the operation of the automatic drafting machine. In this manner, an efficient drafting operation can be performed by the machine. In addition, the present invention prevents the operator from being disturbed by frequent occurrences of noise generated by the motor operating the roll up or wind the paper onto the take-up roller.

What is claimed is:

1. A method of operating an automatic drafting machine having a paper supply means for supplying paper, a platen across which the paper is supplied and upon which drafting operations are to be performed, and a paper take-up mans for performing winding operations to wind paper onto a take-up roller after the paper has been utilized in a drafting operation, said method comprising the steps of:

moving the paper forwardly after each drafting operation by a distance equal to a length of the paper utilized in each respective drafting operation;

ascertaining, after each respective drafting operation, total lengths of paper which have been moved forwardly since a last winding operation;

determining, only after said step of ascertaining said total length of paper whether said total lengths of paper which have been moved forwardly since the last winding operation is greater than a predetermined limiting value; and performing a winding operation, to wind onto the take-up roller an amount paper equal to said total lengths of paper which have been moved forwardly since the last winding operation, when a determination is made, in said step of determining that said total lengths of paper is greater than said predetermined limiting value.

2. A method as recited in claim 1, wherein after the paper is moved forwardly and before the winding operation has taken place, the paper is permitted to hang downwardly between the platen and the take-up roller so as to create slack in the paper and reduce tension thereof.

3. A method as recited in claim 1, wherein said step of moving the paper forwardly is performed by rotating a drive roller with the paper interposed between the drive roller and another roller.

4. A method as recited in claim 1, wherein after each time the paper is moved forwardly, a length value corresponding to said distance moved is added into a computer memory to obtain a total length value;

in said step of determining, said total length value is compared to said predetermined limiting value; and after each winding operation is performed, said memory is cleared.

5. A method of operating an automatic drafting machine having a paper supply means for supplying paper, a platen across which the paper is supplied and upon which drafting operations are to be performed, and a paper take-up means for performing paper take-up operations after the paper has been utilized in a drafting operation, said method comprising the steps of:
- moving the paper forwardly after each drafting operation by a distance equal to a length of the paper utilized in each respective drafting operation;
- ascertaining, after each respective drafting operation, total lengths of paper which have been moved forwardly since a last take-up operation;
- determining, only after said step of ascertaining said total lengths of paper whether a total of the lengths of paper which have been moved forwardly since the last take-up operation is greater than a predetermined limiting value; and
- performing a take-up operation, to take-up an amount of the paper equal to said total lengths of paper which have been moved forwardly since the last take-up operation, when a determination is made, in said step of determining that said total lengths of paper is greater than said predetermined limiting value.

6. A method as recited in claim 5, wherein
after the paper is moved forwardly and before a take-up operation has taken place, the paper is permitted to hang downwardly between the platen and the take-up means so as to create slack in the paper and reduce tension thereof.

7. A method as recited in claim 5, wherein
said step of moving the paper forwardly is performed by rotating a drive roller with the paper interposed between the drive roller and another roller.

8. A method as recited in claim 5, wherein
after each time the paper is moved forwardly, a length value corresponding to said distance moved is added into a computer memory to obtain a total length value;
in said step of determining, said total length value stored in said memory is compared to said predetermined limiting value; and
after each take-up operation is performed, said memory is cleared.

* * * * *